United States Patent [19]

Westerhout

[11] Patent Number: 5,206,063
[45] Date of Patent: Apr. 27, 1993

[54] OPTICAL RECORDING ELEMENT WITH ROM AND RECORDING REGIONS

[75] Inventor: Gerrit D. Westerhout, Eindhoven, Netherlands

[73] Assignee: U.S. Philips Corporation, New York, N.Y.

[21] Appl. No.: 758,916

[22] Filed: Sep. 11, 1991

[30] Foreign Application Priority Data

Sep. 14, 1990 [NL] Netherlands .................. 9002024

[51] Int. Cl.$^5$ .................................................. B32B 3/00
[52] U.S. Cl. ........................................ 428/64; 428/65; 428/913; 430/270; 430/945; 369/280; 369/282; 346/76 L; 346/135.1
[58] Field of Search .................. 428/64, 65, 913; 369/280, 282; 346/1.1, 76 L, 135.1; 430/270, 945

[56] References Cited

U.S. PATENT DOCUMENTS 4,940,618  7/1990  Hamada ........................... 428/64
4,950,520  8/1990  Imai ................................. 428/64

Primary Examiner—Patrick J. Ryan
Assistant Examiner—Elizabeth Evans
Attorney, Agent, or Firm—David R. Treacy

[57] ABSTRACT

An optical recording element comprising a transparent supporting plate, a dye-containing recording layer and a first reflective layer which is applied to a recording layer. The element has a ROM (read only memory) region containing information which can be read optically and a RC (recording) region in which information can be recorded and read optically, the recording layer extending over the ROM and RC regions and a second reflective layer being present in the ROM region between the recording layer and the substrate.

2 Claims, 1 Drawing Sheet

5,206,063

OPTICAL RECORDING ELEMENT WITH ROM AND RECORDING REGIONS

BACKGROUND OF THE INVENTION

The invention relates to an optical recording element comprising a transparent supporting plate, a dye-containing recording layer and a first reflective layer which is applied to a recording layer, said element having a ROM (read only memory) region containing information which can be read optically and a RC (recording) region in which information can be recorded and read optically.

Such an optical recording element is known from the published Europeant Patent Application No. 0353391, to which U.S. Pat. Nos. 4,940,618 and 4,920,388 correspond.

According to exemplary embodiment 1 of the above-mentioned European Patent Application, a layer of an organic cyanine dye is used as the recording layer. Said layer is manufactured by dissolving the dye in an organic solvent. The solution obtained is then provided on the part of the substrate which corresponds to the RC region by means of a customary spin-coating process. During spin-coating, the solvent evaporates and a solid dye layer is obtained. Subsequently, the entire surface of the substrate and the dye layer is provided with an Au-reflective layer which in turn is covered with a protective layer of a UV-cured resin.

Applicants have established that the use of a dye-containing recording layer leads to a low light reflection (<30%) in the boundary region between the ROM region and the RC region. In the ROM and RC regions themselves a light reflection of 70% or more is attained. When using the optical recording element, the information present in the ROM region is scanned by a focused laser light beam. Said laser light beam crosses the boundary line between the ROM region and the RC region and is then directed via guide tracks to a position in the RC region. The laser light energy is increased and an information bit is recorded. This example serves to illustrate that the boundary line between the ROM and RC regions is cross very frequently. It has been found that as a result of the very low reflection in the boundary region between the ROM and RC regions the focusing and control of the laser light beam are no longer accurate and, hence, that a correct recording and reading process is no longer possible.

SUMMARY OF THE INVENTION

It is an object of the invention to overcome this disadvantage. This and other objects are achieved according to the invention by an optical recording element of the type mentioned in the opening paragraph, which recording element is characterized in that the recording layer extends over the ROM and RC regions and that a second reflective layer is present in the ROM region between the recording layer and the substrate.

In a favourable embodiment a second reflective layer is used which contains Ag, Al or Au.

The invention will be explained in greater detail by means of the accompany drawing.

DESCRIPTION OF THE PREFERRED EMBODIMENT

Figure 1:
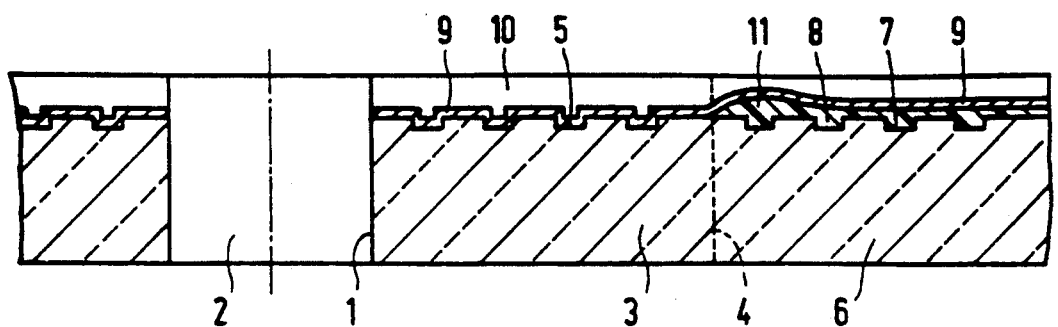
FIG. 1 is a diagrammatic, radial cross-sectional view of an optical recording element according to the state of the art.

The recording element according to the state of the art has a disc-shaped substrate plate of, for example, polycarbonate. Around the central hole 2, said element comprises a portion 3 the outer limit of which is indicated by a dotted line 4. The part 3 is a ROM (read only memory) region in which the information track 5 can be read optically. Said track is spiral-shaped and has a width of 0.6 $\mu$m, a depth of 0.08 $\mu$m and a pitch (distance between the spiral-shaped turns) of 1.6 $\mu$m. The track contains information bits which are located alternately at a higher and a lower level and which an be optically read, in reflection, by means of a laser light beam which is focused on the track. The element further comprises a region 6 which is termed RC region and which adjoins the ROM region 3. In the RC (recording) region information is optically recorded. The RC region 6 comprises a spiral-shaped groove 7, also termed servotrack, which has a width of 0.8 $\mu$m, a depth of 0.08 $\mu$m and a pitch of 1.6 $\mu$m. The information track 5 in the ROM region 3 and the servotrack 7 in the RC region 6 are provided during the manufacture of the substrate plate 1 by means of the injection moulding process used in the manufacture of said substrate plate.

A dye laser 8 is applied to the substrate surface of the RC region 6. During said operation, the substrate surface of the ROM region 3 is covered. Layer 8 is manufactured as follows. A dye, in particular a cyanine dye, is dissolved in an organic solvent. The solution is spin coated onto the substrate surface of the RC region. During spin coating, the recording element is rotated, so that the dye solution applied is distributed over the substrate surface and, in addition, the solvent evaporates.

The cover is removed from the ROM region 3 and a reflective layer 9 of, for example, Au is provided on the substrate surface of the ROM region 3 and on the dye layer 8 of the RC region 6. A process which is suitable for this purpose is a sputtering or a vapour deposition process. Finally, a synthetic resin protective layer 10 is applied to the Au layer 9.

Applicants have gained the insight that in the above method of manufacturing the dye layer a local thickening 11 is formed which, for clarity, is shown disproportionately large in the drawing. At the location of said bulge 11, the absorption of laser light which is focused on the servotrack 7 via the transparent substrate 1 will be increased at the cost of the reflection. According to applicants, this is what causes the very low reflection of (<30%). Owing to said very low reflection, the tracking and focusing of the laser light beam in the area of bulge 11 will be severely disturbed, so that reading and recording are no longer possible.

Figure 2:
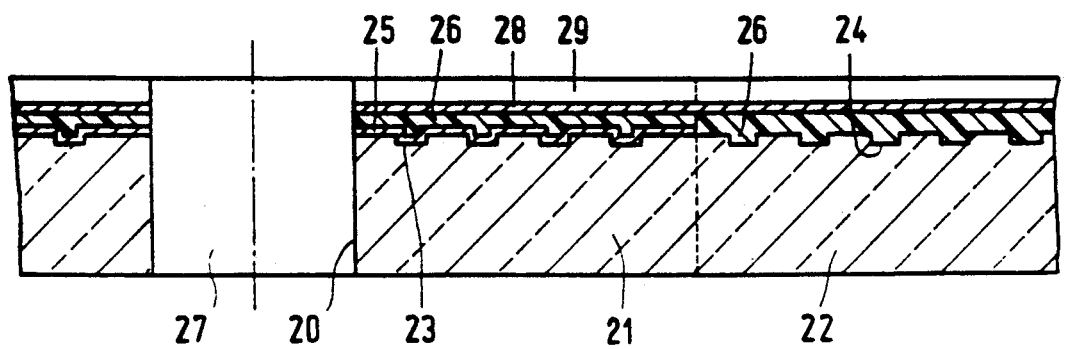
FIG. 2 is a diagrammatic, radial cross-sectional view of an optical recording element according to the invention.

The solution to this problem is obtained by an optical recording element according to the invention, which is shown in FIG. 2.

In FIG. 2, reference numeral 20 denotes a transparent substrate. Said substrate is manufactured from, for example, a transparent synthetic resin such as polycarbonate or polymethyl methacrylate. It is alternatively possible to use a glass substrate. The substrate 20 is disc-shaped with an outside diameter of 120 mm, an inside diameter of 15 mm and a thickness of 1.2 mm. Said dimensions correspond to the standard dimensions of a Compact Disc ®. Like the element of FIG. 1, the optical recording element of FIG. 2 comprises a ROM region 21 and a RC region 22. Said ROM region 21 comprises a spiral-shaped information track 23. Said information track contains optically readable information bits in the form of areas which are located alternately at a higher and a lower level. The longitudinal dimensions of said areas vary in conformity with the information stored from, for example, 0.6 to 3.3 µm. As is customary with CD applications, the information stored is modulated according to the EFM system. The difference in level between the areas is $\lambda/4\,n$, where $\lambda$ is the wavelength of the read laser light and n is the refractive index of the material of the substrate. The width of the areas corresponds approximately to the width (0.6 µm) of the track. Reading takes place on the basis of phase differences in reflected laser light.

In the RC region 22, the substrate 20 is provided with a spiral-shaped groove 24, also termed servotrack, at the upper surface. Laser light which is focused on said servotrack 24 via the transparent substrate 20 is led along said servotrack or guide track on the basis of phase differences with the area surrounding the track.

The information track 23 and the servotrack 24 are provided by means of a mould during the injection moulding process used in the manufacture of the substrate. In the ROM region 21 a metal layer 25, in particular a layer of Ag, Au or Al, is applied to the substrate surface having the information track 23. A suitable method of applying said metal layer is a sputtering process or a vapour deposition process. The substrate surface in the RC region 22 is covered during the sputtering or vapour-deposition process. The thickness of the metal layer is small and amounts to, for example, 30–50 nm.

A dye layer 26 is applied to the entire substrate surface, i.e., to the metal layer 25 of the ROM region 21 and to the substrate surface containing the servotrack 24 in the RC region 22. For this purpose, an organic cyanine dye is dissolved in an organic solvent such as diacetone alcohol. The solution is deposited in the centre of the substrate surface. The optical recording element is rotated, so that the solution is distributed over the entire surface of the substrate and, in addition, evaporation of the solvent takes place either simultaneously or subsequently. In this manner, a layer having a uniform thickness of, for example, 30–50 nm is obtained. The dye layer applied may exhibit a thickened portion in the centre of the disc. Said central portion, however, is removed at a later stage and the central hole 27 is formed.

A metal mirror 28 of, for example, Au or Al is provided on the dye layer 26 by means of sputtering or vapour deposition, after which a protective layer 29 of a synthetic resin, such as a light-cured layer of acrylates or methacrylates, is applied to said metal mirror.

The optical recording element according to the invention is read by a laser light beam which is focused on the information track 23 of the ROM region 21 via the transparent substrate 20. Reading takes place on the basis of phase differences in reflected light. The amount of light reflected exceeds 80% and, hence, amply meets CD standard requirements.

For the recording of information a laser light beam is used which is focused on the dye layer 26 in the RC region 22 via the transparent substrate 20. In the reading process, the laser light beam follows the servotrack 24 on the basis of phase differences in reflected light. The laser light beam is modulated according to EFM modulation system in conformity with the information to be recorded. In the exposed areas, a change takes place in the dye layer, in particular in the boundary region of the dye layer and the substrate surface. Said change may involve the formation of a pit in the substrate surface or the diffusion of dye molecules in the substrate surface. This leads to a change of the absorption of the recording element in the exposed areas and, hence, also to a change of the reflection. The recorded information can be read optically by a standard CD player. In all cases, the reflection in the RC region exceeds 70%. A decrease of the reflection to below 30% in the boundary region between the ROM region and the RC region was not observed, so that the above-mentioned recording and reading problems of the known recording element in accordance with FIG. 1 do not occur.

I claim:

1. An optical recording element having a ROM (read only memory) region containing information which can be read optically and a RC (recording) region in which information can be recorded and read optically, comprising a transparent supporting plate, a first reflective layer disposed over said ROM and RC regions, and a dye-containing recording layer disposed in said RC region between said substrate and said first reflecting layer,
    characterized in that said recording layer extends over said ROM region, and
    a second reflective layer is disposed over said ROM region between said recording layer and said substrate.

2. An optical recording element as claimed in claim 1, characterized in that the second reflective layer contains Ag, Al or Au.

* * * * *